No. 761,010. Patented May 24, 1904.

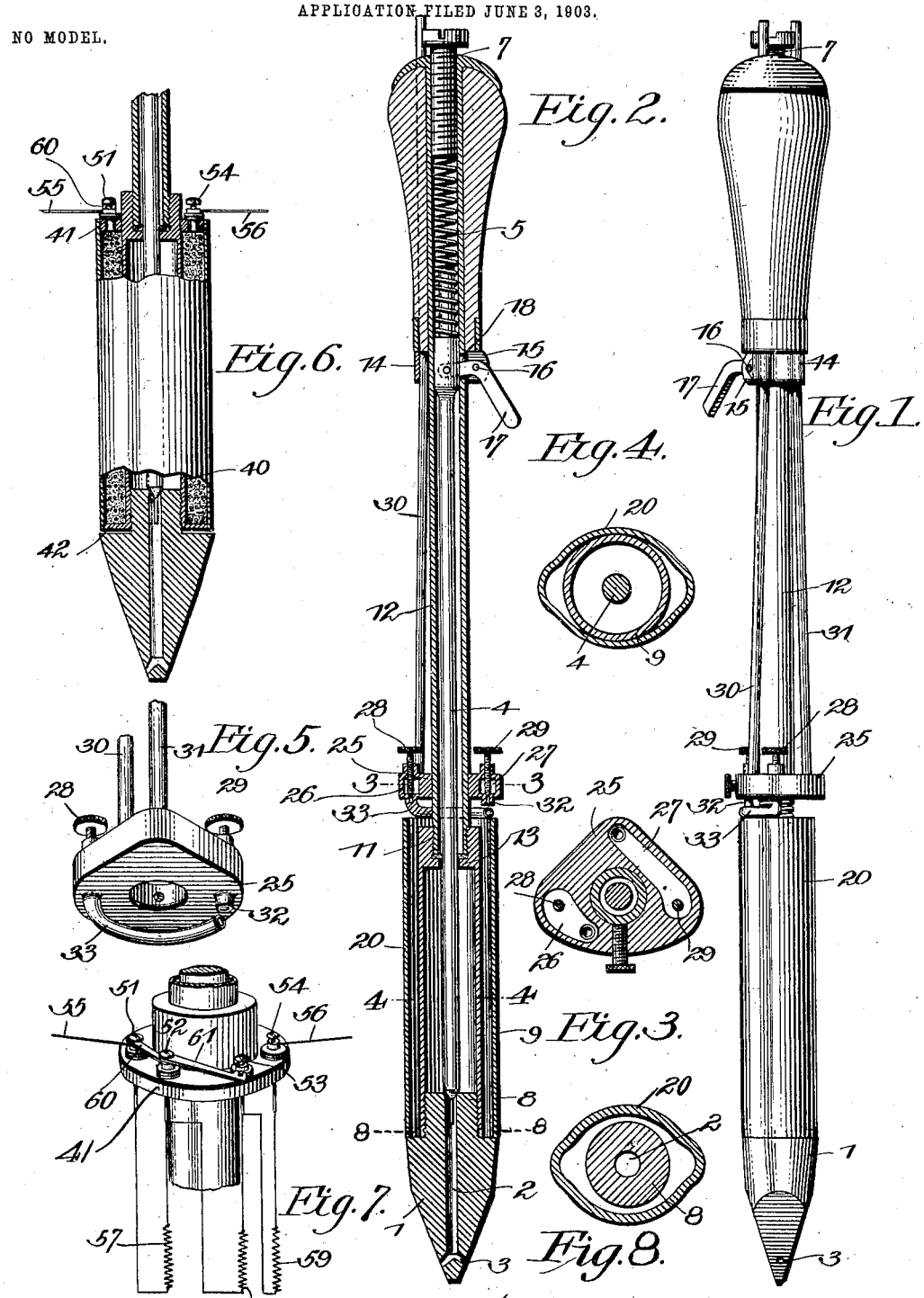

UNITED STATES PATENT OFFICE.

CHARLES B. RODGERS, OF BORDENTOWN, NEW JERSEY.

SOLDERING-IRON.

SPECIFICATION forming part of Letters Patent No. 761,010, dated May 24, 1904.

Application filed June 3, 1903. Serial No. 159,969. (No model.)

*To all whom it may concern:*

Be it known that I, CHARLES B. RODGERS, a citizen of the United States, residing at Bordentown, in the county of Burlington and State of New Jersey, have invented a new and useful Soldering-Iron, of which the following is a specification.

This invention relates to certain improvements in soldering-irons; and it has for its principal object to provide a novel form of iron in which a body of solder is kept in a molten state in a suitable reservoir and allowed to flow as required through a valved opening or openings.

A further object of the invention is to provide a soldering-iron in which the solder-heating means may be readily adjusted to maintain the temperature at any desired point and in which a single heating means may be employed for heating both the solder and the tip or point of the iron.

A still further object of the invention is to provide a device of this character in which the heating apparatus is in part interchangeable to permit the use of a burning fluid or the application of an electric current to maintain the solder in its molten state.

With these and other objects in view the invention consists in the novel construction and arrangement of parts hereinafter described, illustrated in the accompanying drawings, and particularly pointed out in the appended claims, it being understood that various changes in the form, proportion, size, and minor details of the structure may be made without departing from the spirit or sacrificing any of the advantages of the invention.

In the accompanying drawings, Figure 1 is a side elevation of a soldering-iron constructed in accordance with the invention. Fig. 2 is a sectional elevation of the soldering-iron. Fig. 3 is a sectional plan view of the same on the line 3 3 of Fig. 2. Fig. 4 is a similar view on the line 4 4 of Fig. 2. Fig. 5 is a detail perspective view of a portion of the iron. Fig. 6 is a view similar to Fig. 2, illustrating the arrangement of the device when an electric current is employed for heating purposes. Fig. 7 is a detail perspective view showing the arrangement of the switching mechanism by which the current is controlled. Fig. 8 is a sectional plan view on the line 8 8 of Fig. 2.

Similar numerals of reference are employed to indicate corresponding parts throughout the several figures of the drawings.

In the drawings, 1 designates the soldering-iron tip, preferably formed of copper and which may be of the pyramidal form in common use or of hatchet style generally used for running seams. The tip is provided with an opening 2, extending nearly to the point of the iron and thence connected to transverse passages 3, forming discharge-ports, through which the solder may flow to the point of the iron. The upper portion of the opening 2 is arranged to form a valve-seat for the reception of a tapering valve formed at the lower end of a valve-rod 4, which extends up within the hollow shank and handle of the iron and is normally pressed to closed position by means of a coiled compression-spring 5, arranged within the handle. The handle is hollow, and at its upper end is a threaded opening through which the valve-rod and its spring may be introduced, the opening being afterward closed by a threaded plug 7, which may be utilized to adjust the stress of the spring, if necessary.

At the top of the tip member is a boss 8, having external threads adapted to a threaded opening in the lower end of a solder-reservoir 9, which is preferably in the form of a metallic tube, while in order to prevent wear a perforated disk is riveted or otherwise secured to the top of the boss to form a seat for the valve. The upper end of the reservoir-casing is provided with a threaded opening 11 for the reception of the threaded lower end of the shank 12 of the iron, and immediately below this threaded opening is an inwardly-extending annular flange 13, forming, in connection with the lower end of the shank member, a stuffing-box for the valve-rod, suitable packing, such as asbestos fiber, being introduced in the box in order to prevent the leakage of molten solder around the rod.

The shank is formed of a hollow tube, and its upper end is connected in any suitable manner to the handle. At a point near the upper end of the shank is a clamping-collar 14, having terminal spaced lugs 15, forming a support for a pivot-pin 16, on which is mounted a valve-operated lever 17. The outer end of the lever is provided with a thumb-piece conveniently arranged near the handle, while the inner end projects through a slot 18, formed in the upper portion of the valve-rod, so that the workman will at all times have the valve under control and may regulate the quantity of the solder flowing from the reservoir-tip, while by releasing the lever the compression-spring may act to instantly move the valve to closed position.

Surrounding the reservoir is a casing 20, which may be of elliptical form in cross-section, the smaller diameter of the casing being but slightly larger than the diameter of the reservoir, so that the casing may be readily clamped in position while side spaces, Fig. 4, are left between the reservoir and casing to form a heating-chamber into which a burning fluid may be introduced in order to maintain the reservoir at the desired temperature. The casing is somewhat longer than the reservoir, and its lower end projects a short distance below the bottom of said reservoir, while the contour of the casing and tip are preferably the same in order to add to the appearance of the iron. By placing the casing somewhat below the bottom of the reservoir there is formed a slight space at the lower end of the casing, so that the heating fluid may impinge on the top of the tip, and thus maintain the tip at the proper temperature, as well as to keep the solder in a molten condition. The products of combustion pass downward through the channel at one side of the reservoir and after striking the tip divide and pass around the boss 8 of the tip and thence up through the channel at the opposite side of the reservoir.

The heating fluid is preferably gas and is introduced by means of a flexible tube connected in any suitable manner to a source of supply, the tube freely yielding to permit the manipulation of the tool by the workman.

To the lower portion of the shank is secured a block 25, having two passages 26 and 27, in each of which is formed a valve-seat adapted for the reception of needle-valves 28 and 29, respectively. The gas-supply tube 30 extends downward through the handle and inside the shank, its lower end communicating with the passage 26, while an air-supply tube 31 leads in similar manner to the passage 27, the air-tube being connected to the reservoir, in which a supply of air is maintained under pressure. The air-passage communicates with an outlet-nozzle 32, arranged immediately above the open portion of the casing, while the gas-passage communicates with an outlet-pipe 33, terminating at a point adjacent to the air-nozzle, the two nozzles meeting in a manner somewhat similar to that employed in atomizers. The two tubes are partly held in place by means of the clamp or collar which forms the support of the valve-lever.

The air and gas under suitable pressure issue from the nozzles, the supply of each being controlled by the valves, or in place of gas a liquid hydrocarbon may be employed. The heating fluid is ignited, and the jet is directed downward within the casing on the outer surface of the solder-reservoir, impinging on the top of the soldering-tip, and thence through the space at the bottom of the casing to the opposite side of the reservoir and upward to the discharging-point on that side of the casing opposite to the entering-point of the jet. The solder in the reservoir is thus maintained in a liquid condition and flows through the openings in the heated tip to the point of discharge, the quantity of the flow being regulated by the valve.

In some cases where it is more convenient to employ an electric current for heating purposes the casing and reservoir may be removed and an electrically-heated reservoir substituted therefor. The electrically-heated reservoir is in the form of a tube 40, having threaded upper and lower ends for connection with the shank and soldering-tip, respectively. At the upper end of the reservoir is a collar 41, and at the lower end is a flange 42, these members forming, in connection with the reservoir, a spool on which may be wound current-conducting wires, formed of German silver or other material offering high resistance to the passage of the current, and the wires are embedded in or covered with an insulating material of any desired character.

In order that the temperature may be properly regulated, a number of separate windings are employed, and by means of suitable switches the current may be directed through a portion or all of these windings.

On the upper portion of the collar 41 are arranged a number of binding-posts 51, 52, 53, and 54, the positive wire 55 being connected to the post 51, while the negative wire 56 is connected to the post 54. The arrangement of the resistance-coils 57, 58, and 59 is shown in diagram form, and the collar 41 carries switches 60 and 61, which may be moved to open or closed positions in order to throw one or more of the resistance-coils out of circuit.

When both switches 60 and 61 are in open position, the current entering through wire 55 travels from resistance-coil 57 to the binding-post 52, resistance-coil 58, binding-post 53, resistance-coil 59, and binding-post 54 to negative wire. When the switch 61 is closed, the resistance-coil 57 is cut out, and the heating effect is lessened, or by closing both switches 60 and 61 the two coils 57 and 58 may be cut out. In this manner the temperature may be regulated in accordance with requirements, it being possible to employ any desired number of coils, and these may be subdivided and each subdivision controlled by a separate switch.

Having thus described the invention, what is claimed is—

1. In a soldering-iron, a hollow tip member, a reservoir connected to the tip member, a hollow shank connected to the reservoir, a valve for controlling the flow of solder from the reservoir, a valve-rod extending through the hollow shank, an operating-lever connected to the rod, conducting-tubes for the heating fluid, controlling-valves for the heating fluid, and a support carried by the shank for said controlling-valves.

2. In combination, a tip member having a solder-passage, a reservoir connected to the tip member and provided with a stuffing-box, a shank connected to the reservoir and forming a gland-nut for the stuffing-box, a valve for controlling the flow of solder from the reservoir, and a valve-rod extending through said stuffing-box.

3. In a soldering-iron, a tip member having a solder-passage, a reservoir connected thereto, and a casing surrounding the reservoir and provided with passages arranged on opposite sides of the reservoir, said passages being connected at their lower ends to form a complete circuit for the heating fluid around the reservoir.

4. In a soldering-iron, a tip member having a solder-passage, a solder-reservoir and hollow shank connected to the reservoir, a handle secured to the hollow shank, a valve for controlling the flow of solder from the reservoir, and a valve-operating rod extending through the reservoir, the shank and handle.

5. The combination with a soldering-iron, of a tip member having solder-passages, a reservoir connected to the tip member and provided at its upper end with a threaded opening, an inwardly-extending annular flange arranged adjacent to the opening and forming the inner wall of a stuffing-box, a hollow shank member fitting within said threaded opening, and forming an adjustable stuffing-box member, a valve for closing the solder-passage, and a valve-rod extending through the reservoir, the stuffing-box and the shank.

6. The combination in a soldering-iron, of a tip having a solder-passage, a reservoir connected to the tip, a casing surrounding the reservoir and bearing against the inner wall of the tip, said casing being arranged to form two passages disposed on opposite sides of the reservoir, and means for directing a jet of heating fluid into one of said passages.

7. The combination in a soldering-iron, of a tip member having a solder-passage, a reservoir connected thereto, a casing surrounding the reservoir and extending slightly below the same to thereby form a cross-passage adjacent to the point of connection with the tip, said casing having its opposite walls contracted for engagement with opposite sides of the reservoir to thereby form two separate passages for a heating fluid, and means for introducing the fluid into one of said passages.

8. The combination in a soldering-iron, of a tip member having a solder-passage, a reservoir connected thereto, a casing surrounding the reservoir, a shank member, a block carried by the shank member and provided with a passage for a heating fluid, a valve disposed in said passage, a supply-tube leading to the passage, and a discharge-nozzle leading from said passage and adapted to direct the heating fluid into the casing.

9. The combination in a soldering-iron, of a tip member having a solder-passage, a reservoir connected to the tip member, a casing surrounding the reservoir, a shank member, a block carried thereby and provided with air and gas passages, valves disposed in said passages, air and gas tubes supported in part by the shank and connected to the passages, and discharge-nozzles leading from said passages, substantially as specified.

10. The combination in a soldering-iron, of a tip member having a solder-passage, a reservoir connected thereto, a casing surrounding the reservoir, a hollow shank member connected to the reservoir, a handle connected to the shank, a valve-rod leading through the handle, the shank and reservoir and having a terminal valve at the solder-passage of the tip, a stuffing-box formed at the juncture of the reservoir and shank, a block carried by the shank and provided with air and gas passages, valves in said passages, discharge-nozzles leading from the passages to the casing, air and gas supply tubes connected to the passages, a clamping-collar surrounding the shank in the tubes and having terminal ears, a pivot-pin connecting the ears, a valve-operating lever hung on said pin and provided with a terminal front piece adjacent to the handle, substantially as specified.

In testimony that I claim the foregoing as my own I have hereto affixed my signature in the presence of two witnesses.

CHARLES B. RODGERS.

Witnesses:
    JOHN WHELAHAN,
    JAMES MULQUEEN.